(12) United States Patent
Freeman et al.

(10) Patent No.: US 10,449,470 B1
(45) Date of Patent: Oct. 22, 2019

(54) SYSTEMS AND PROCESSES FOR RECYCLING WASTE GREASE

(71) Applicants: Abe N. Freeman, Kissimmee, FL (US); Matthew Blake Freeman, Kissimmee, FL (US)

(72) Inventors: Abe N. Freeman, Kissimmee, FL (US); Matthew Blake Freeman, Kissimmee, FL (US)

( * ) Notice: Subject to any disclaimer, the term of this patent is extended or adjusted under 35 U.S.C. 154(b) by 984 days.

(21) Appl. No.: 13/856,059

(22) Filed: Apr. 3, 2013

Related U.S. Application Data

(60) Provisional application No. 61/619,514, filed on Apr. 3, 2012.

(51) Int. Cl.
*B01D 17/02* (2006.01)

(52) U.S. Cl.
CPC ................ *B01D 17/0214* (2013.01)

(58) Field of Classification Search
None
See application file for complete search history.

(56) References Cited

U.S. PATENT DOCUMENTS

| | | | | |
|---|---|---|---|---|
| 3,723,309 A | * | 3/1973 | Garcia | B03B 9/02 210/195.1 |
| 5,098,584 A | | 3/1992 | Leen et al. | |
| 5,225,085 A | * | 7/1993 | Napier | B03B 9/00 210/121 |
| 5,487,907 A | * | 1/1996 | Drown | C11B 1/14 134/25.3 |
| 5,507,954 A | * | 4/1996 | Carrillo | B01D 17/0205 210/195.1 |
| 6,168,723 B1 | * | 1/2001 | Moody | B01D 17/005 210/167.31 |
| 7,161,017 B2 | * | 1/2007 | Garro | B01D 3/143 554/205 |
| 7,384,562 B2 | | 6/2008 | Rogers et al. | |
| 7,632,319 B2 | * | 12/2009 | Rogers | C02F 1/56 210/710 |

(Continued)

OTHER PUBLICATIONS

Primary Author(s): Doménéc Jolis, Ph.D & Mary Martis, P.E.; Brown Grease Recovery and Biofuel Demonstration Project Oceanside Water Pollution Control Plant; California Energy Commission; 138 pages; Mar. 2012.*

*Primary Examiner* — Robert J Popovics
(74) *Attorney, Agent, or Firm* — Christopher M. Ramsey; GrayRobinson, P.A.

(57) ABSTRACT

A process involves heating waste grease in a first separation chamber to separate it into a primary oil, aqueous, and solid phase and decanted the primary oil phase by flowing it upwardly and over a liquid impermeable barrier and into a second separation chamber. Components of the primary oil phase are separated into a secondary oil, aqueous, and solid phase. The secondary oil phase is decanted by flowing it upwardly and over a different liquid impermeable barrier and into a heating chamber. In the heating chamber, the secondary oil phase is heated to a temperature sufficient to separate components of the secondary oil phase into a tertiary oil phase, aqueous phase, and solid phase. The tertiary oil phase comprising brown grease is extracted. The remaining tertiary aqueous and solid phases in the heating chamber may be heated again to produce a tertiary oil phase comprising additional brown grease.

11 Claims, 5 Drawing Sheets

(56) References Cited

U.S. PATENT DOCUMENTS

| | | | |
|---|---|---|---|
| 7,754,931 B2 | 7/2010 | Monnier et al. | |
| 7,806,945 B2 | 10/2010 | Jackam et al. | |
| 7,871,448 B2 | 1/2011 | Jackam et al. | |
| 8,003,833 B2 | 8/2011 | Appel et al. | |
| 8,911,513 B2 * | 12/2014 | Crosier | C10L 1/02 44/308 |
| 9,327,997 B1 * | 5/2016 | Kuper | C02F 1/048 |
| 2008/0229654 A1 | 9/2008 | Bradin et al. | |
| 2008/0250831 A1 * | 10/2008 | Rogers | C02F 1/56 71/25 |
| 2009/0057234 A1 * | 3/2009 | Armstrong | C02F 1/38 210/703 |
| 2009/0139137 A1 | 6/2009 | Ikura et al. | |
| 2009/0293568 A1 * | 12/2009 | Macchio | C05F 7/00 71/12 |
| 2010/0113848 A1 | 5/2010 | Strege et al. | |
| 2010/0175312 A1 | 7/2010 | Roden et al. | |
| 2010/0228068 A1 | 9/2010 | O'Connor et al. | |
| 2011/0197497 A1 | 8/2011 | Jlang et al. | |
| 2012/0030993 A1 * | 2/2012 | Crosier | C10L 1/02 44/308 |

* cited by examiner

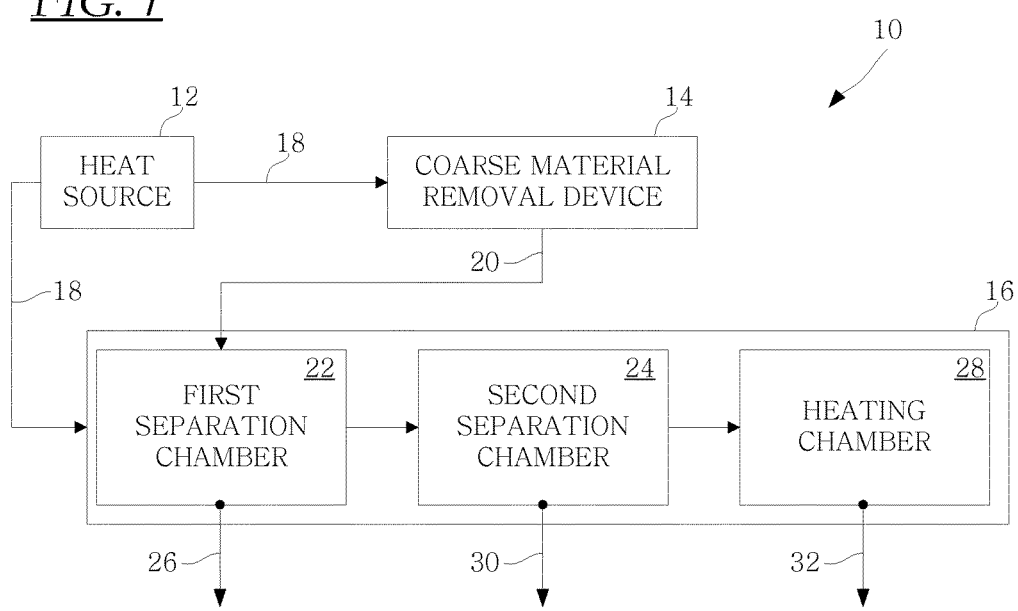

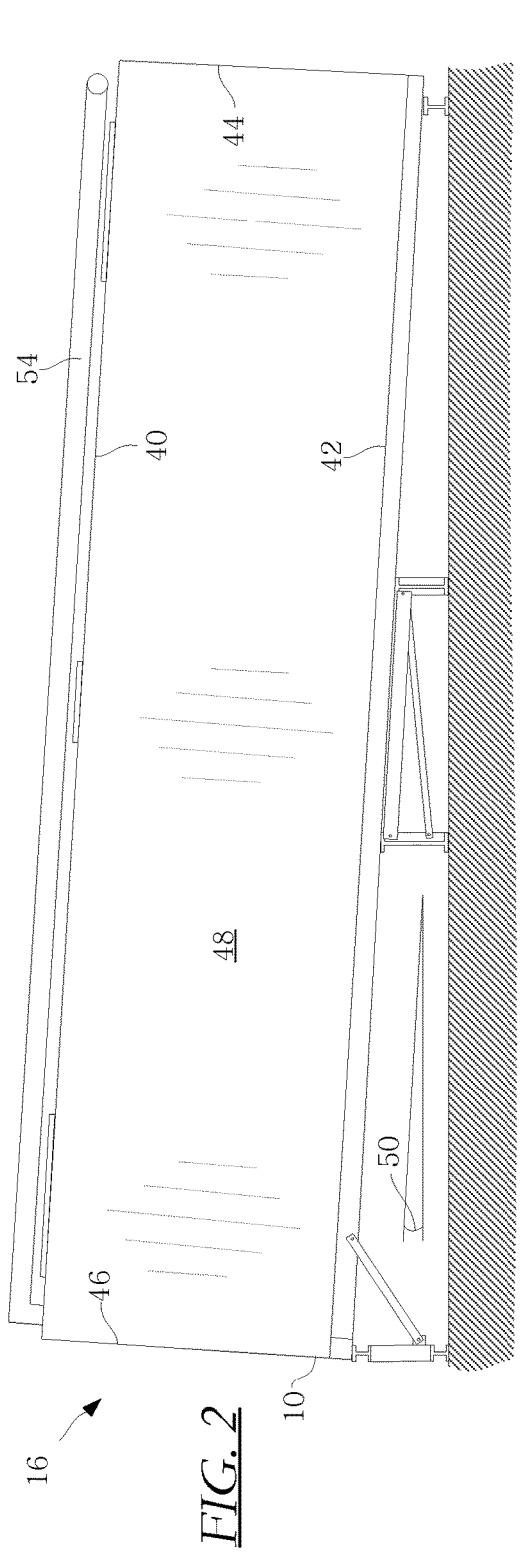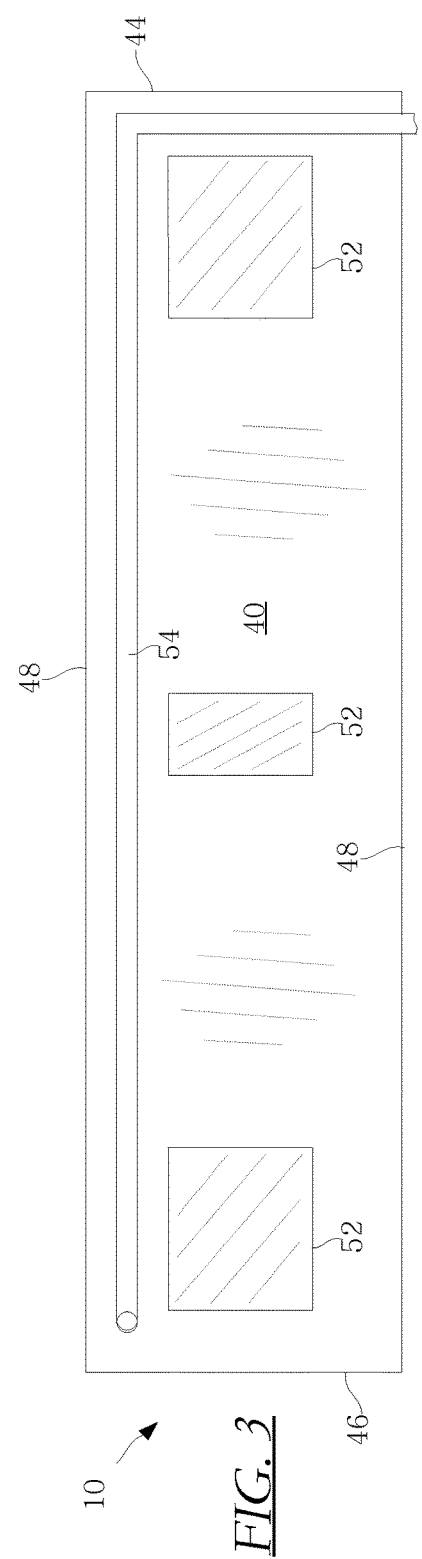

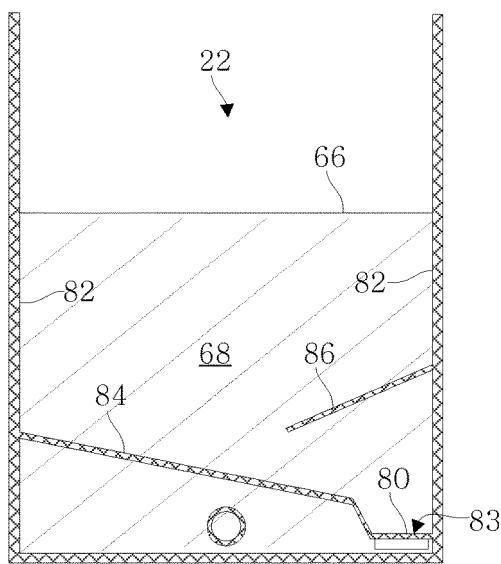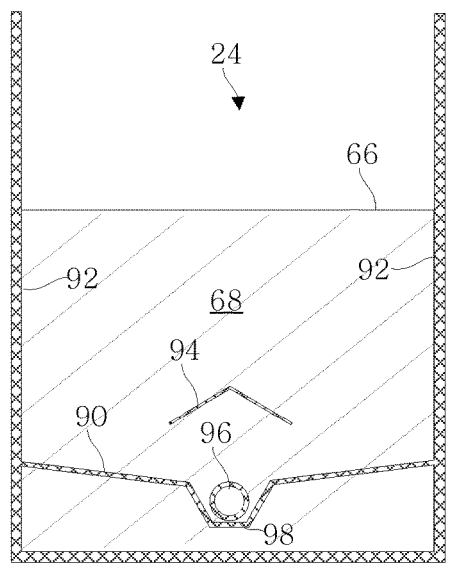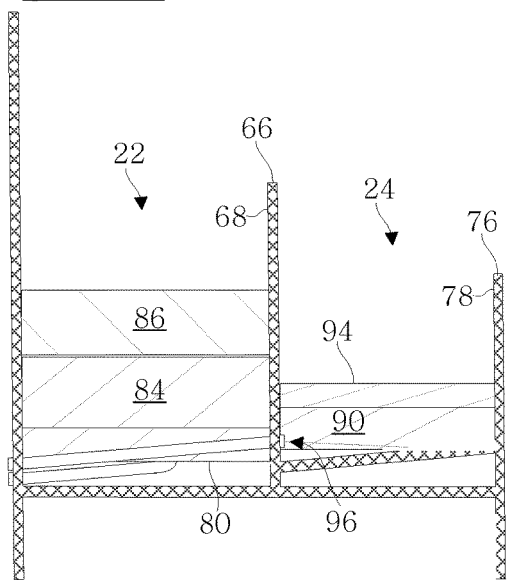

SYSTEMS AND PROCESSES FOR RECYCLING WASTE GREASE

CROSS-REFERENCE TO RELATED APPLICATION

This claims priority to provisional application Ser. No. 61/619,514, filed on Apr. 3, 2012 and titled "System and Method for Recycling Grease Trap Waste," which is incorporated by reference in its entirety.

FIELD OF THE INVENTION

The invention relates to the field of recycling waste grease, and, more particularly, to refining waste grease brown into brown grease.

BACKGROUND OF THE INVENTION

Restaurants and other food service businesses generate tons of waste grease each day, which is captured in a grease trap or interceptor. Waste grease of this type typically includes used cooking oil, food waste, grease, fats, and oils. When not managed properly, grease trap waste can cause significant environmental problems. Unfortunately, the majority of waste grease is either sent to landfills or disposed of through municipal sewer systems. Most wastewater treatment plants will not accept waste grease because it is difficult to process. Municipalities are attempting to alleviate problems associated with waste grease by implementing strict regulations for its treatment, but these strict regulations have not been met with an increased number of waste grease treatment facilities.

Brown grease is a valuable component of waste grease because it can be used to as a biofeedstock material for making biofuels, but, unfortunately it is difficult to extract from the waste grease. The raw waste grease typically includes lipid, aqueous, and solid components, the percentages of which will vary based on the source of waste grease. The solid components may include food waste, dirt, and debris. The lipid components include fats, oils, free fatty acids, glycerides, and combinations thereof.

SUMMARY

In view of the foregoing, an object of the invention is to provide systems and processes for refining brown grease from waste grease.

In a first process aspect of the invention, the process for refining brown grease from waste grease involves heating waste grease in a first separation chamber thermally coupled to a heat source to a temperature sufficient to render the waste grease flowable. In the first separation chamber, components of the flowable waste are separated into a primary oil phase, aqueous phase, and solid phase. The primary oil phase is decanted from the primary aqueous and solid phases by flowing the primary oil phase upwardly and over a liquid impermeable barrier and into a second separation chamber thermally coupled to the heat source. In the second separation chamber, components of the primary oil phase are separated into a secondary oil phase, aqueous phase, and solid phase. The secondary oil phase is decanted from the secondary aqueous and solid phases by flowing the secondary oil phase upwardly and over a different liquid impermeable barrier and into a heating chamber thermally coupled to the heat source. In the heating chamber, the secondary oil phase is heated to a temperature sufficient to separate components of the secondary oil phase into a tertiary oil phase, aqueous phase, and solid phase. The tertiary oil phase is extracted from the heating chamber while leaving the tertiary aqueous and solid phases therein. The remaining tertiary aqueous and solid phases in the heating chamber are then to a temperature sufficient to form a quaternary oil phase from the tertiary aqueous and solid phases. The quaternary oil phase is separately extracted from the remaining tertiary aqueous and solid phases. Both the tertiary and quaternary oil phases comprise refined brown grease.

In a second process aspect of the invention, the process for refining brown grease from waste grease involves introducing waste grease into a first separation chamber, having a bottom and first vertical sidewall defining a hollow interior for containing the waste grease, the first vertical sidewall including a first overflow boundary for allowing waste grease components to overflow the vertical sidewall and heating the waste grease to a temperature sufficient to render the waste grease flowable. Components of the flowable waste grease in the first separation chamber are separated into primary oil, aqueous, and solid phases until a volume of waste grease therein is sufficient to cause the primary oil phase to overflow the first overflow boundary and into a second separation chamber. The second separation chamber includes a bottom and second vertical sidewall defining a hollow interior for containing the primary oil phase, the second vertical sidewall including a second overflow boundary for allowing primary oil phase components to overflow the second vertical sidewall. Components of the primary oil phase in the second separation chamber are separated into secondary oil, aqueous, and solid phases until a volume of the primary oil phase therein is sufficient to cause the secondary oil phase to overflow the second overflow boundary and into a heating chamber. The secondary oil phase in the heating chamber is heated to a temperature sufficient to separate components of the secondary oil phase into tertiary oil, aqueous, and solid phases. The tertiary oil phase is extracted from the tertiary aqueous and solid phases. The tertiary oil phase comprises refined brown grease.

In a system aspect of the invention, a system for refining brown grease from waste grease includes a housing having a top wall, bottom wall, and vertical sidewall extending between the top wall to bottom wall to define a hollow interior space for containing liquid. The interior space includes first and second separation chambers and a heating chamber. The first separation chamber includes a bottom and first vertical sidewall for containing waste grease liquid. The first vertical sidewall is arranged to prevent liquid flow out of the first separation chamber until the liquid flows up the first vertical sidewall and over a first overflow boundary along the first vertical sidewall. The second separation chamber is in liquid flow communication with the first overflow boundary so as to receive liquid overflowing the first overflow boundary. The second separation chamber includes a bottom and second vertical sidewall spaced apart from the first vertical sidewall for containing the liquid, the second vertical sidewall arranged to prevent liquid flow out of the second separation chamber until the liquid flows up the second vertical sidewall and over a second overflow boundary along the second vertical sidewall. The heating chamber is in liquid flow communication with the second overflow boundary so as to receive liquid overflowing the second overflow boundary. The heating chamber includes a metallic heating element positioned along a bottom thereof and an agitation device for agitating liquid therein.

These and other objects, aspects, and advantages of the present invention will be better appreciated in view of the drawings and following detailed description of the preferred embodiments.

BRIEF DESCRIPTION OF THE DRAWINGS

FIG. 1 is a schematic of a system for refining brown grease from waste grease according to an embodiment of the invention;

FIG. 2 is a side elevation view of a separation housing according to an embodiment of the invention;

FIG. 3 is a top plan view of the separation housing of FIG. 2;

FIG. 5 is a back cutaway plan view of the first separation chamber of the separation housing of FIG. 2;

FIG. 6 is a front cutaway plan view of the first separation chamber of the separation housing of FIG. 2;

FIG. 7 is a side cutaway elevation view of the separation chamber of the separation housing of FIG. 2.

DETAILED DESCRIPTION OF PREFERRED EMBODIMENTS

Figure 4:
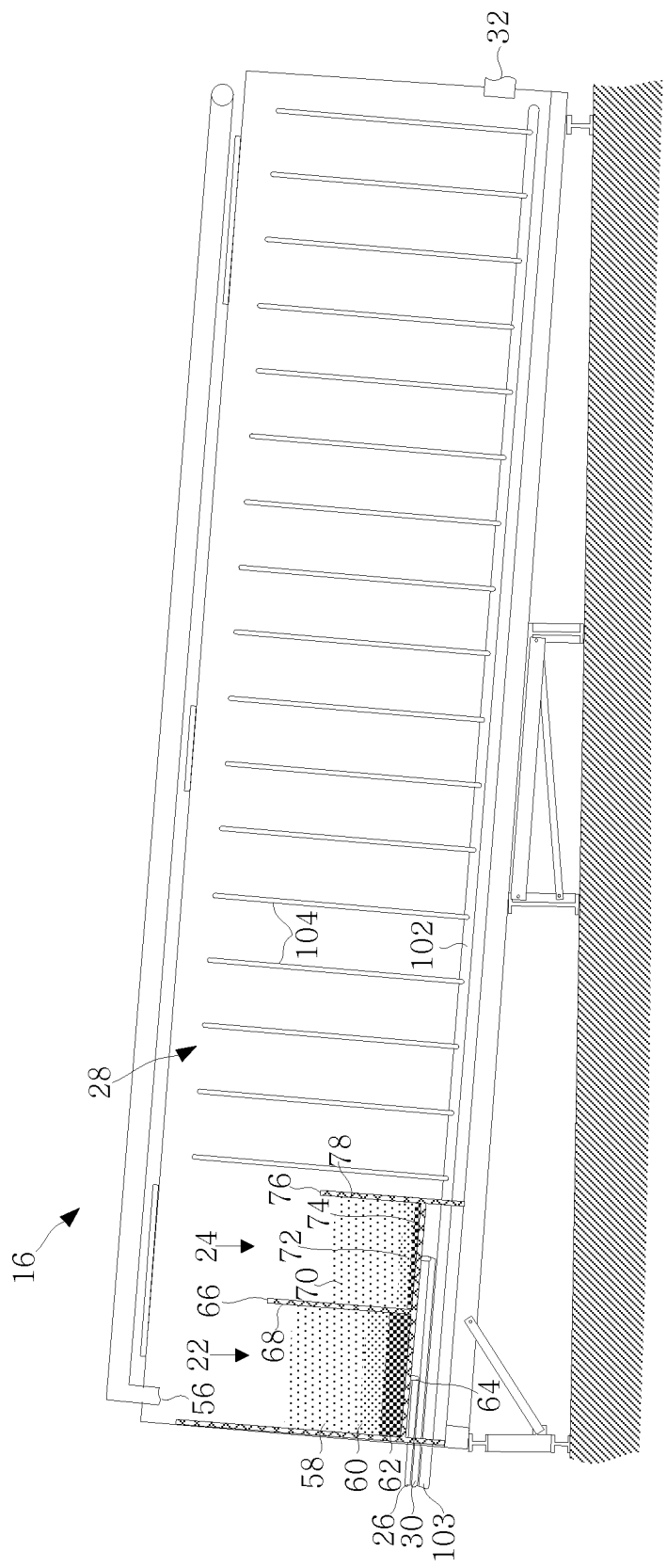
FIG. 4 is a side cutaway view of the separation housing of FIG. 2, showing the separation housing interior.

In the Summary of the Invention above and in the Detailed Description of Preferred Embodiments, reference is made to particular features (including process steps) of the invention. Where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other features, ingredients, steps, etc. are optionally present. When reference is made herein to a process comprising two or more defined steps, the steps can be carried in any order or simultaneously (except where the context excludes that possibility), and the process can include one or more steps which are carried out before any of the defined steps, between two of the defined steps, or after all of the defined steps (except where the context excludes that possibility).

This invention may be embodied in many different forms and should not be construed as limited to the embodiments set forth herein. Rather, these embodiments are provided so that this disclosure will convey preferred embodiments of the invention to those skilled in the art.

An aspect of the invention is to provide a system for extracting valuable brown grease from grease trap waste. During the process, solids and water may also be extracted from the grease trap waste. Advantageously, the solids, water, and brown grease may all be recycled and reused.

Referring first to FIG. 1, a system 10 for refining waste grease includes a heat source 12 thermally coupled to a coarse material removal device 14 and a separation housing 16.

The heat source 12 is a heat generating device such as a boiler, which produces steam that is transported to the coarse material removal device 14 and separation housing 16 via steam conduits 18 such as a pipe, tubing, or the like. Although a boiler is the preferred heat source 12, it is noteworthy that other types of heat sources 12 such as combustion and/or electrical types may also be used.

In practice, the raw waste grease is transferred from a raw waste container, typically on a truck, into the coarse material removal device 14. The interior of the coarse material removal device 14 is then heated to a temperature that is sufficient to cause the waste grease to flow. Preferably, this temperature is between about 100-350° F., more preferably 200-300° F., and even more preferably 250° F. Although such temperatures are preferred, it should be understood that this temperature will depend on the thermal properties of the particular waste grease and coarse removal device 14 used. In many cases it may be beneficial to measure the temperature of the raw waste itself. In a typical embodiment, it is preferred that the temperature of the raw waste is approximately between 50-150° F., more preferably 100-125° F., and even more preferably 110° F. to render it flowable.

An exemplary apparatus that can be used as the coarse material removal device 14 is an auger-type device that moves the flowable waste grease through a filter. An example of this type of device is a device called THE ROCKET, which can be purchased commercially from Slingshot Industries of Kissimmee, Fla. In this example, the coarse material removal device 14 includes an auger that assists the flowable waste in passing through a coarse filter, thereby removing any coarse solids from the flowable waste grease. Although the invention is not limited to a particular size of filter openings, good results have been obtained by using filter openings having a largest dimension of no more than ⅜". Depending on the source of the waste grease or other variable, larger filter openings may be used.

Once the coarse solids are removed, the flowable waste grease is then moved via a pipe 20 from the coarse material removal device 14 to the separation housing 16. Typically, the flowable waste grease reaches the separation housing 16 at a temperature of approximately 80-130° F.

In the separation housing 16, the waste grease is first fed into a first separation chamber 22. In the first separation chamber the waste grease separates into a primary solid phase, a primary aqueous phase, and a primary oil phase. The primary oil phase is decanted from the primary aqueous and solid phases by flowing the primary oil phase upwardly and over a liquid impermeable barrier and into a second separation chamber 24. The primary aqueous and solid phases may be removed from the first separation chamber by a removal pipe 26 coupled to the first separation chamber 22.

In the second separation chamber 24, the primary oil phase components are separated into a secondary oil phase, secondary aqueous phase, and secondary solid phase. The secondary oil phase is decanted from the secondary aqueous and solid phases by flowing the secondary oil phase upwardly and over a different liquid impermeable barrier and into a heating chamber 28. The secondary aqueous and solid phases may be removed from the second separation chamber by a removal pipe 30 coupled to the second separation chamber 24.

The first and second separation chamber 22, 24 are preferably heated to about 100° F. to about 200° F., more preferably about 120° F. to about 140° F., or even more preferably about 130° F. to maintain the flowability of the material.

In the heating chamber 30, the secondary oil phase components are separated into a tertiary oil phase, tertiary aqueous phase, and tertiary solid phase. This is achieved by heating the heating chamber to about 175° F. to about 210° F., more preferably about 190° F. to about 200° F., or even more preferably about 195° F. to about 200° F. Once the desired temperature is reached, the heat is turned off and the material in the heating chamber 28 is allowed to settle to form the tertiary oil phase, tertiary aqueous phase, and tertiary solid phase. A preferred settling time is at least 36 hours, or about 36 to about 40 hours. During this time, brown grease in the form of the tertiary oil phase settles to the top and the tertiary solid and aqueous phases settle below. The brown grease is decanted and transported to a storage container.

If desired, additional brown grease is separated from the tertiary aqueous and solid phases remaining in the heating chamber 28 by heating the heating chamber 28 to about 175° F. to about 250° F., more preferably about 190° F. to about 225° F., or even more preferably about 200° F. to about 215° F. Once the desired temperature is reached, the heat is turned off and the material in the heating chamber 28 is allowed to settle. A preferred settling time in this step is about 15 hours. During this time, additional brown grease forms as a quaternary oil phase on top, with the remaining tertiary oil and aqueous phases on bottom. The resulting brown grease is removed and placed in the storage container. A removal pipe 32 coupled to the heating chamber 28 is used to remove the solid and aqueous material from the heating chamber.

Advantageously, almost all of the solid and aqueous material produced during this process may be re-used for other purposes. Accordingly, this process produces very little waste and allows for almost complete recycling of the raw grease waste components.

An exemplary separation housing, according to an embodiment of the invention is now discussed with reference to FIGS. 2-9. As best shown in FIGS. 2 and 3, the separation housing 16 includes a top 40, bottom 42, front 44, back 46, and two opposing side walls 48. It is preferred that the components of the exterior structure of the separation housing 16 are connected together in such a way that renders the separation housing 16 substantially leak proof. Preferably, the top 40, bottom 42, front 44, back 46, and two opposing side walls 48 are welded together along their joints in the interior of the separation housing 16. Because the flowable liquid typically flows first into the back 46 of the housing 16, it is preferred that the back 46 is elevated to help liquid travel from the back 46 towards the front 44 as the separation process proceeds. A preferred angle 50 of elevation is about 2-15°, or about 3.5°.

The top 40 of the separation housing 16 includes a plurality of doors 52 for accessing the interior of the separation housing 16. The top 40 of the housing 16 also includes a transfer conduit 54 for transferring the flowable waste from the coarse removal device 14 into the separation housing 16.

Referring to FIG. 4, the interior of the separation housing 16 includes the first separation chamber 22, second separation chamber 24, and the heating chamber 28.

In practice, the flowable grease waste is initially fed into the first separation chamber 22 via an inlet port 56 adjacent the first separation chamber 22. While in the first separation chamber 22, the flowable grease waste is allowed to separate into the solid phase 62, an aqueous phase 60, and a primary oil phase 58. The solid phase 62 and aqueous phase 60 may be drained from the bottom of the first separation chamber 22 via a drain conduit 64 attached to the removal pipe 26.

The flowable waste grease may be continuously fed into the first separation chamber 22. As the volume of the waste grease increases, the solid 62 and aqueous phase 60 materials will separate to the bottom, leaving the primary oil phase 58 as the top layer. The height of the primary oil phase 58 eventually reaches the top of the first separation chamber 22, and overflows a first flows overflow boundary 66 positioned along a vertical wall 68 of the first separation chamber 22. The first vertical wall 68 forms a liquid impermeable barrier between the first separation chamber 22 and second separation chamber 24.

In the second separation chamber 24, the secondary oil 70, aqueous 72 and solid 74 phases form from the primary oil phase 58 components that did not previously separate in the first separation chamber 22. Accordingly, the secondary oil phase 70 comprises a higher percentage of the desired brown grease than the primary oil phase 58. Eventually, the volume in the second separation chamber 24 is substantial enough to raise the secondary oil phase 70 over a second overflow boundary 76 positioned along a second vertical wall 78 of the second separation chamber 24. The second vertical wall 78 forms a liquid impermeable barrier between the second separation chamber 24 and heating chamber 28. The material in the secondary oil phase 70 passes over the second overflow boundary 76 and enters the heating chamber 28.

Referring to FIGS. 5-7, the first and second separation chambers 22, 24 are shown in more detail.

In FIG. 5, the interior of the first separation chamber 22 is shown as viewed looking inward from the back 46 towards the vertical wall 68. The first separation chamber 22 has a first separation chamber bottom 80 and two opposing side walls 82. The vertical wall 68 including the first overflow boundary 66 can be seen in the background. The wall opposite the first vertical wall 68 is not shown so that the interior of the first separation chamber 22 can be seen. A drain 83 that is connected to the removal pipe 26 is located at the bottom 80.

Drainage of solid and aqueous phase materials from the first separation chamber 22 is assisted by including a plurality of angled walls that extend longitudinally into the first separation chamber 22 from the opposing side walls 82. A first angled wall 84 extends downwardly from the side wall on the same side as the inlet port 56 toward the drain 83 and extends between the vertical wall 68 and rear wall. A second angled wall 86 extends downwardly from the opposite side wall 82 and extends between the vertical wall 68 and rear wall. The second angled wall 86 preferably extends far enough into the first separation chamber 22 such that it covers the drain 83. The angled walls 84, 86 allow the solid and aqueous phase materials to be drained quickly from the second separation chamber 22 by preventing a vortex from forming over the drain 84.

In FIG. 6, the interior of the second separation chamber 24 is shown as viewed looking inward from the front 44 towards the first vertical wall 68. The second separation chamber 24 includes a second separation chamber bottom 90, two opposing side walls 92, and the first vertical wall 68, including the first overflow boundary 66. The second vertical wall 78, including the second overflow boundary 76 is not shown for clarity. A substantially V shaped member 94 extends between the first vertical wall 68 and second vertical wall 78 over a drain 96 that is connected to the drain removal line 30 at the second separation chamber bottom 90. The second separation chamber bottom 90 extends between the first vertical wall 68 and second vertical wall 78 and slopes downwardly from the two opposing side walls 92 toward the center of the chamber 24. The drain is located in a depression 98 at the at the third separation chamber bottom 90. The shape of the bottom 90 and the location of the substantially V-shaped member 94 enhance the speed at which the solid and aqueous phases materials may be removed from the second separation chamber 24.

The first and second overflow boundaries 66, 76 are preferably vertically offset from one another such that the second overflow boundary 76 is positioned below the first overflow boundary 66. This facilitates overflow of the second separation chamber 24 once filled with a smaller volume.

Figure 8:
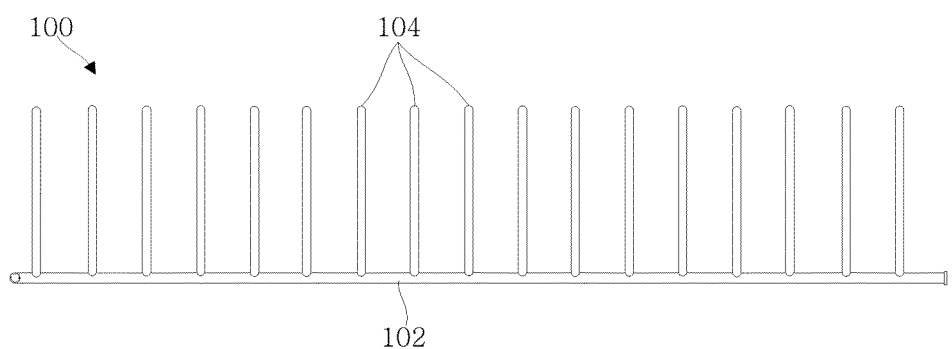
FIG. 8 is a side elevation view of the heating conduit system of the separation chamber of FIG. 2.
Figure 9:
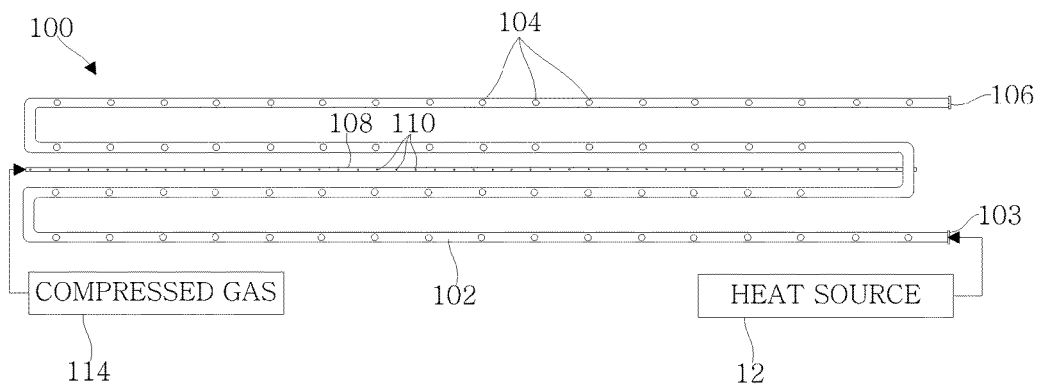
FIG. 9 is a top plan view of the heating conduit system of the separation chamber of FIG. 2.

Details of the heating chamber are now described with reference to FIGS. 4, 8, and 9. In a preferred embodiment, heat is supplied to the heating chamber 28 by passing steam through a high surface area conduit system 100 that is in contact with the product in the heating chamber 28. In this embodiment the high surface area conduit system 100 includes a supply conduit 102 running substantially along the bottom of the heating chamber 28. The supply conduit 102 supplies steam to a plurality of vertically extending spires 104 that are arranged throughout the heating chamber 28. The spires 104 are preferably hollow closed pipes that allow the steam to flow therein.

The supply conduit 102 is preferably a serpentine metallic pipe to enhance the amount of conduit surface area that contacts the material in the heating chamber 28. In the particular embodiment shown, the supply conduit 102 has four branches that pass substantially along the length of the heating chamber 28. Along the two peripheral branches there are seventeen spires 104 each, and along the two interior branches there are fifteen spires 104 each. Although this is not intended to be limiting, good results have been obtained with this configuration.

Steam is fed from the heat source 12 through the supply conduit 102 into a steam input port 103 and exits through a supply conduit output 106.

The separation of impurities from the product may be enhanced by an agitation device for agitating or stirring the material in the heating chamber 28. In one embodiment, the agitating device is high volume low pressure compressed gas from a compressed gas source 114. In this embodiment, the compressed gas is fed through a gas line 108 that runs substantially along the length of the heating chamber 28. A plurality of perforations 110 along the gas line 108 allow the compressed gas to escape into the heating chamber 28, agitating the material.

The invention has been described hereinabove with reference to the accompanying drawings, in which preferred embodiments of the invention are shown. Unless otherwise defined, all technical and scientific terms used herein are intended to have the same meaning as commonly understood in the art to which this invention pertains and at the time of its filing. Although various methods and materials similar or equivalent to those described herein can be used in the practice or testing of the invention, suitable methods and materials are described. However, the skilled should understand that the methods and materials used and described are examples and may not be the only ones suitable for use in the invention.

Moreover, it should also be understood that any temperature, or any other measurements, quantities or numerical figures expressed herein are intended to be approximate and not an exact or critical figure unless expressly stated to the contrary.

Further, any publications, patent applications, patents, and other references mentioned herein are incorporated by reference in their entirety as if they were part of this specification. However, in case of conflict, the present specification, including any definitions, will control. In addition, as noted above, materials, methods and examples given are illustrative in nature only and not intended to be limiting.

The specification set forth above discloses typical preferred embodiments of the invention, and although specific terms are employed, the terms are used in a descriptive sense only and not for purposes of limitation. The invention has been described in some detail, but it will be apparent that various modifications and changes can be made within the spirit and scope of the invention as described in the foregoing specification and as defined in the appended claims.

That which is claimed is:

1. A process for refining brown grease from waste grease, the process comprising:
    heating waste grease in a first separation chamber thermally coupled to a heat source to a temperature sufficient to render the waste grease flowable;
    separating components of the flowable waste grease in the first separation chamber into a primary oil phase, aqueous phase, and solid phase;
    decanting the primary oil phase from the primary aqueous and solid phases by flowing the primary oil phase upwardly and over a liquid impermeable barrier and into a second separation chamber thermally coupled to the heat source;
    separating components of the primary oil phase in the second separation chamber into a secondary oil phase, aqueous phase, and solid phase;
    decanting the secondary oil phase from the secondary aqueous and solid phases by flowing the secondary oil phase upwardly and over a different liquid impermeable barrier and into a heating chamber thermally coupled to the heat source;
    heating the secondary oil phase in the heating chamber to a temperature sufficient to separate components of the secondary oil phase into a tertiary oil phase, aqueous phase, and solid phase;
    extracting the tertiary oil phase from the heating chamber while leaving the tertiary aqueous and solid phases therein;
    heating the remaining tertiary aqueous and solid phases in the heating chamber to a temperature sufficient to form a quaternary oil phase from the tertiary aqueous and solid phases; and
    separately extracting the quaternary oil phase from the remaining tertiary aqueous and solid phases;
    wherein the tertiary and quaternary oil phases comprise refined brown grease.

2. The process of claim 1, wherein the temperature sufficient to separate components of the secondary oil phase into a tertiary oil phase, aqueous phase, and solid phase is about 175 degrees F. to about 210 degrees F.

3. The process of claim 1, wherein the temperature sufficient to form a quaternary oil phase from the tertiary aqueous and solid phases is about 175 degrees F. to about 250 degrees F.

4. The process of claim 1, wherein:
    flowing the primary oil phase upwardly and over the liquid impermeable barrier is achieved supplying a sufficient amount of waste grease to the first separation chamber to cause the primary oil phase to overflow the first liquid impermeable barrier; and
    flowing the secondary oil phase upwardly and over the different liquid impermeable barrier is achieved supplying a sufficient amount of primary oil phase to the second separation chamber to cause the secondary oil phase to overflow the different liquid impermeable barrier.

5. A process for refining brown grease from waste grease, the process comprising:

introducing waste grease into a first separation chamber, having a bottom and first vertical sidewall defining a hollow interior for containing the waste grease, the first vertical sidewall including a first overflow boundary for allowing waste grease components to overflow the vertical sidewall;

heating the waste grease to a temperature sufficient to render the waste grease flowable;

separating components of the flowable waste grease in the first separation chamber into primary oil, aqueous, and solid phases until a volume of waste grease therein is sufficient to cause the primary oil phase to overflow the first overflow boundary and into a second separation chamber;

the second separation chamber having a bottom and second vertical sidewall defining a hollow interior for containing the primary oil phase, the second vertical sidewall including a second overflow boundary for allowing primary oil phase components to overflow the second vertical sidewall;

separating components of the primary oil phase in the second separation chamber into secondary oil, aqueous, and solid phases until a volume of the primary oil phase therein is sufficient to cause the secondary oil phase to overflow the second overflow boundary and into a heating chamber;

heating the secondary oil phase in the heating chamber to a temperature sufficient to separate components of the secondary oil phase into tertiary oil, aqueous, and solid phases; and separately extracting the tertiary oil phase from the tertiary aqueous and solid phases, wherein the tertiary oil phase comprises refined brown grease;

wherein the first vertical sidewall is common to the first and second separation chambers and the second vertical sidewall is common to the second separation chamber and heating chamber.

6. The process of claim 5, further comprising heating the remaining tertiary aqueous and solid phases in the heating chamber to a temperature sufficient to form a quaternary oil phase from the tertiary aqueous and solid phases and separately extracting the quaternary oil phase from the remaining aqueous and solid phases.

7. The process of claim 5, wherein temperature sufficient to form a quaternary oil phase from the tertiary aqueous and solid phases is about 175 degrees F. to about 250 degrees F.

8. The process of claim 5, wherein the second overflow boundary is positioned below the first overflow boundary.

9. The process of claim 5, wherein:

the first separation chamber is positioned within a proximal end of a housing;

the heating chamber is positioned within a distal end of the housing;

the second separation chamber is positioned between the first separation chamber and heating chamber; and the housing is downwardly sloped from the proximal end to the distal end.

10. The process of claim 5, wherein:

the first separation chamber is positioned within a proximal end of a housing;

the heating chamber is positioned within a distal end of the housing; and the second separation chamber is positioned between the first separation chamber and heating chamber.

11. A process for refining brown grease from waste grease, the process comprising:

heating waste grease in a separation chamber that is thermally coupled to a heat source to a temperature sufficient to render the waste grease a flowable liquid;

separating components of the flowable liquid waste grease in the separation chamber into a first oil phase and a first aqueous phase;

decanting the first oil phase from the first aqueous phase by flowing the first oil phase over a liquid impermeable barrier and into a heating chamber that is thermally coupled to the heat source;

heating the decanted first oil phase in the heating chamber to a temperature sufficient to separate components of the first oil phase into a second oil phase and a second aqueous phase; and extracting the second oil phase from the heating chamber, wherein the second oil phase comprises refined brown grease, wherein:

the separation chamber and heating chamber are within the same housing; and the separation chamber and heating chamber are thermally coupled to the heat source by heated air heated by the heat source and freely flowing throughout the housing.

* * * * *